US010911413B2

(12) United States Patent
Herrero (10) Patent No.: US 10,911,413 B2
(45) Date of Patent: Feb. 2, 2021

(54) ENCAPSULATING AND TUNNELING WEBRTC TRAFFIC

(71) Applicant: Oracle International Corporation, Redwood Shores, CA (US)

(72) Inventor: Rolando Herrero, Derry, NH (US)

(73) Assignee: Oracle International Corporation, Redwood Shores, CA (US)

(*) Notice: Subject to any disclaimer, the term of this patent is extended or adjusted under 35 U.S.C. 154(b) by 252 days.

(21) Appl. No.: 14/855,542

(22) Filed: Sep. 16, 2015

(65) Prior Publication Data

US 2017/0078359 A1    Mar. 16, 2017

(51) Int. Cl.
| | |
|---|---|
| *H04L 29/06* | (2006.01) |
| *H04L 12/46* | (2006.01) |
| *H04N 21/4788* | (2011.01) |
| *H04W 12/00* | (2009.01) |
| *H04N 7/15* | (2006.01) |

(52) U.S. Cl.
CPC ...... *H04L 63/0428* (2013.01); *H04L 12/4625* (2013.01); *H04L 12/4633* (2013.01); *H04N 21/4788* (2013.01); *H04W 12/001* (2019.01); *H04L 63/0272* (2013.01); *H04N 7/15* (2013.01)

(58) Field of Classification Search
CPC ............. H04L 63/0428; H04L 12/4625; H04L 12/4633; H04L 63/0272; H04W 12/001; H04N 21/4788
USPC ......................................................... 709/217
See application file for complete search history.

(56) References Cited

U.S. PATENT DOCUMENTS

| | | | | |
|---|---|---|---|---|
| 2002/0007416 A1* | 1/2002 | Putzolu | ............. | H04L 29/06027 709/231 |
| 2004/0103277 A1* | 5/2004 | Seada | ................. | H04L 63/0209 713/160 |
| 2008/0275905 A1* | 11/2008 | Hannuksela | ............ | G06F 16/40 |
| 2011/0137809 A1* | 6/2011 | Klapheke | ............... | G06Q 10/00 705/304 |
| 2012/0317295 A1* | 12/2012 | Baird | ....................... | H04L 67/02 709/228 |
| 2013/0060906 A1* | 3/2013 | Gan | .................... | H04L 65/4084 709/219 |
| 2013/0275492 A1* | 10/2013 | Kaufman | .............. | H04L 63/029 709/203 |

(Continued)

FOREIGN PATENT DOCUMENTS

WO    WO-2015035232 A2 *    3/2015    ............. H04L 47/32

OTHER PUBLICATIONS

H. Schulzrinne et al.; "RTP: A Transport Protocol for Real-Time Applications";Jul. 2003; 89 pages.

(Continued)

*Primary Examiner* — Umar Cheema
*Assistant Examiner* — Tony Williams
(74) *Attorney, Agent, or Firm* — Potomac Law Group, PLLC (57) ABSTRACT

A system that traverses Web Real-Time Communication ("WebRTC") data over a tunnel establishes the tunnel between a tunneling client of a user equipment ("UE") and a tunneling server. The system receives the WebRTC data and encapsulates the WebRTC data into frames. The system detects that one or more of the frames includes media. The system then transmits the frames over the tunnel while, for the frames detected as media, applying enhancement features to the transmitting of the media frames.

20 Claims, 6 Drawing Sheets

(56) References Cited

U.S. PATENT DOCUMENTS

| | | | | |
|---|---|---|---|---|
| 2013/0283037 A1* | 10/2013 | Katz | ................... | H04L 63/0272 |
| | | | | 713/151 |
| 2013/0329595 A1* | 12/2013 | Scholz | ................... | H04L 65/80 |
| | | | | 370/252 |
| 2014/0044123 A1* | 2/2014 | Lawson | .............. | H04L 65/1023 |
| | | | | 370/352 |
| 2014/0126714 A1* | 5/2014 | Sayko | ................. | H04M 3/5191 |
| | | | | 379/265.09 |
| 2014/0222930 A1* | 8/2014 | Gangadharan | .......... | H04L 51/04 |
| | | | | 709/206 |
| 2014/0379931 A1* | 12/2014 | Gaviria | ............... | H04L 65/1016 |
| | | | | 709/227 |
| 2015/0039687 A1 | 2/2015 | Waxman et al. | | |
| 2015/0207834 A1* | 7/2015 | Zhao | ................... | H04N 21/631 |
| | | | | 709/231 |

OTHER PUBLICATIONS

3rd Generation Partnership Project; Technical Specification Group Services and System Aspects; Study on firewall traversal (Stage 2) (Release 12); 3GPP TR 33.830 V0. 5.0 (Nov. 2013).

* cited by examiner

| V | P | X | CC | M | PT |
|---|---|---|----|---|----|
| SN ||||||
| TS (high) ||||||
| TS (low) ||||||
| SSRC (high) ||||||
| SSRC (low) ||||||
| CSRC (high) ||||||
| CSRC (low) ||||||

ENCAPSULATING AND TUNNELING WEBRTC TRAFFIC

FIELD

One embodiment is directed generally to a communications network, and in particular, to delivering real-time traffic over a communications network.

BACKGROUND INFORMATION

Voice communications are increasingly shifting to web and Internet based applications that are outside of traditional telephony networks. Enterprise users desire to access their unified communications applications with their own Internet connected mobile devices, and consumers increasingly prefer Internet-based communications channels for accessing contact centers.

Some communications service providers ("CSPs") and enterprises have deployed real-time communications ("RTC") applications based on a protocol known as "Web Real-Time Communication" ("WebRTC"). WebRTC is an open Internet standard for embedding real-time multimedia communications capabilities (e.g., voice calling, video chat, peer to peer ("P2P") file sharing, etc.) into a web browser. For any device with a supported web browser, WebRTC can use application programming interfaces ("APIs") to equip the device with RTC capabilities without requiring users to download plug-ins. By using WebRTC, CSPs may create new web based communications services and extend existing services to web based clients.

SUMMARY

One embodiment is a system that traverses Web Real-Time Communication ("WebRTC") data over a tunnel. The system establishes the tunnel between a tunneling client of a user equipment ("UE") and a tunneling server. The system receives the WebRTC data and encapsulates the WebRTC data into frames. The system detects that one or more of the frames includes media. The system then transmits the frames over the tunnel while, for the frames detected as media, applying enhancement features to the transmitting of the media frames.

DETAILED DESCRIPTION

One embodiment encapsulates and encodes WebRTC traffic so that it can be sent from one user endpoint to another user endpoint via a virtual private network ("VPN") tunnel. In one embodiment, the VPN tunnel is established using the Tunneled Services Control Function ("TSCF") standard. Embodiments detect media (e.g., real-time voice traffic or video/audio traffic) packets among the tunneled traffic, and further may provide quality improvements and enhancement features to the detected media packets/streams that traverse the tunnel, including media compression functionality and redundant packet functionality.

As discussed, WebRTC provides an innovative set of standard APIs that allow regular web browsers to initiate and terminate real time communication ("RTC") traffic without the need of third party plug-ins or extensions. Both speech and video streams are transmitted as regular datagram Voice over IP ("VoIP") traffic, taking advantage of legacy protocols such as Real-time Transport Protocol ("RTP") and secure RTP ("SRTP").

However, one problem with known WebRTC functionality is network address translation ("NAT") traversal that prevents datagram traffic from flowing through firewalls. This imposes the need for additional "session traversal utilities for NAT" ("STUN") servers and "traversal using relays around NAT" ("TURN") servers distributed throughout the network, thus adding costs and complexity to the infrastructure.

VPNs can provide a solution to this problem by encapsulating all traffic, regardless of its nature, over transmission control protocol ("TCP"), and transporting it through firewalls. VPNs are fully compatible with web browsers and appear as an additional network interface where traffic can be sent. However, known VPNs are typically not adapted to work with media, as they are typically intended for data traffic that is insensitive to latency and highly dependent of content integrity. Therefore, embodiments integrate VPN support in TSCF in order to apply a rich set of media within the tunneling architecture so to allow for relatively low cost traversal of WebRTC media through firewalls.

Figure 1:
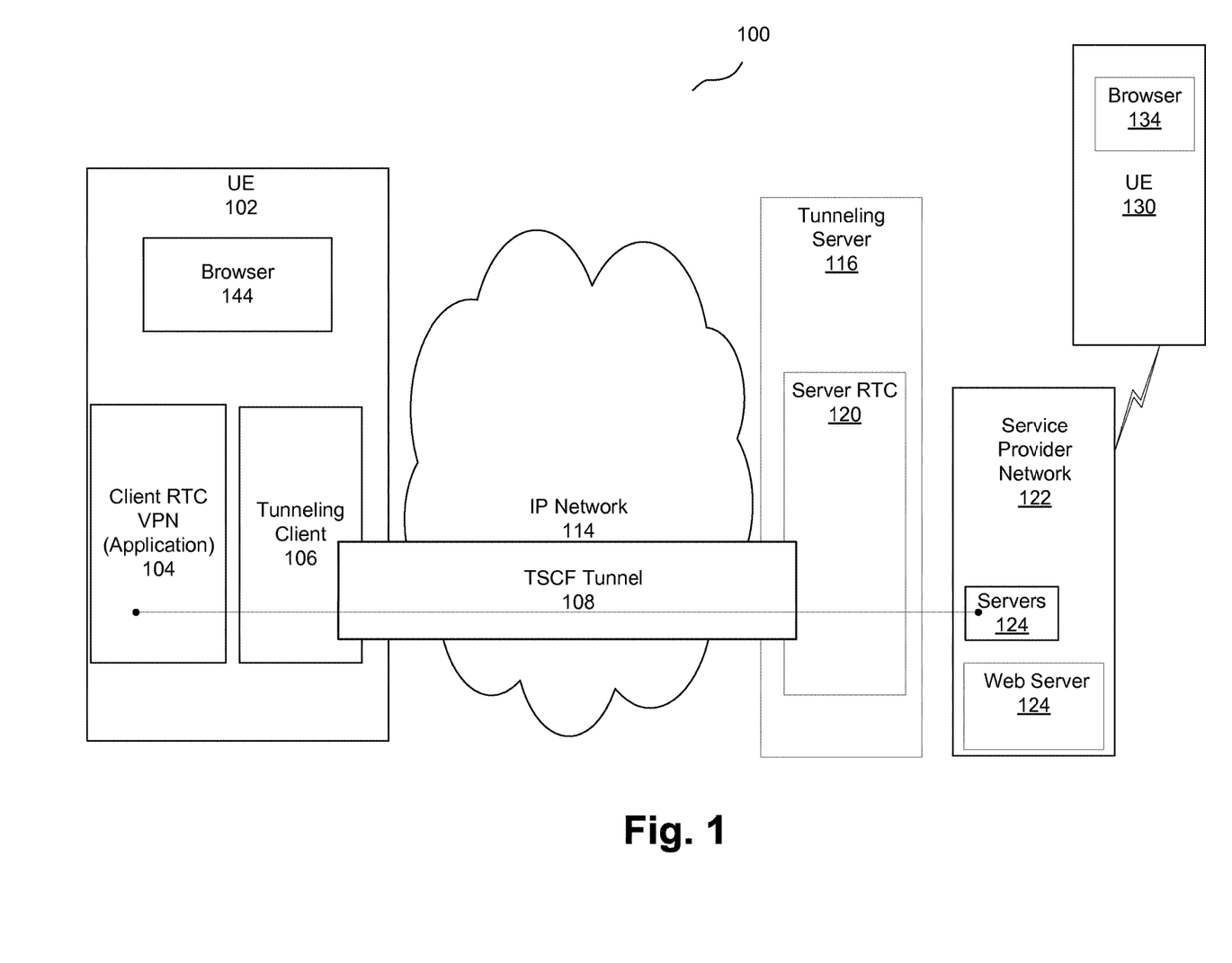
FIG. 1 is an overview diagram of a network including network elements that implement embodiments of the present invention and/or interact with embodiments of the present invention.

FIG. 1 is an overview diagram of a network 100 including network elements that implement embodiments of the present invention and/or interact with embodiments of the present invention. Network 100 includes a user equipment ("UE") 102 that performs real-time communications ("RTC") over an Internet Protocol ("IP") network 114 with a service provider network/backbone 122. In RTC, users exchange information instantly or with insignificant latency. Example applications for RTC include voice and/or video calls, application streaming, softphones, and remote desktop applications. UE 102 may be any device used by an end-user for communications, such as a smartphone, a laptop computer, a tablet, a television, etc.

In performing RTC, UE 102 communicates signaling and media traffic with respective servers 124 in service provider network 122 on the untunneled side of server 116. Signaling traffic may be communicated according to an application layer protocol such as the Session Initiation Protocol ("SIP"). SIP is configured to be independent of the underlying transport layer. Accordingly, SIP can run on different transport protocols, such as the Transmission Control Protocol ("TCP" as described in, for example, Internet Engineering Task Force ("IETF") request for comments ("RFC")

793 and RFC 675), the User Datagram Protocol ("UDP" as described in, for example, IETF RFC 768), etc.

Network 100 further includes a tunneling server 116 that, together with a tunneling client 106 within UE 102, provides functionality for establishing and managing one or more tunnels for performing RTC according to the Tunneled Services Control Function ("TSCF") standard as described in, for example, 3rd generation partnership program ("3GPP") technical report ("TR") 33.830 V0.5.0, the disclosure of which is hereby incorporated by reference in its entirety. In one embodiment, tunneling client 106 and tunneling server 116 establish a TSCF tunnel 108 that is compliant with TSCF tunnel management (e.g., tunnel initialization, maintenance, termination, etc., as defined by, e.g., 3GPP TR 33.830 V0.5.0), and TSCF tunnel transport protocols are supported for the negotiation of TSCF tunnel 108 between tunneling client 106 and tunneling server 116.

The TSCF standard provides client side and server side network elements for establishing managed tunnels for performing RTC (e.g., tunneling client 106 and tunneling server 116 in FIG. 1). It also provides two types of outer layer tunneling transports: a stream-based outer layer tunneling transport via TCP or Transport Layer Security ("TLS"), and a datagram-based outer layer tunneling transport via UDP or Datagram Transport Layer Security ("DTLS").

TLS is a cryptographic protocol as provided in, for example, IETF RFC 2246, RFC 4346, RFC 5246, and/or RFC 6176. DTLS is a protocol that provides communications privacy for datagram protocols. TCP and TLS provide reliable, ordered and error-checked delivery of the inner layer traffic, but introduce undesirable latency that is detrimental to RTC applications over a communications network that experiences impairments. On the other hand, UDP and DTLS do not guarantee reliable delivery, thus minimizing latency and being desirable for RTC.

In some embodiments, IP network 114 may include security devices (e.g., firewalls, proxies, etc.) that allow traffic of only a certain transport protocol (e.g., only TCP, only UDP, etc.). Accordingly, tunneling client 106 and tunneling server 116 may establish and manage TSCF tunnel 108 such that UE 102 may use it to traverse such security devices and connect to tunneling server 116 to reach servers 124 in service provider network 122.

The TSCF standard further provides control messages for exchanging configuration information between tunneling client 106 and tunneling server 116. According to the TSCF standard, control messages are of a "request/response" type, and a control message response for a request includes either a corresponding reply or an error code indicating why the request cannot be honored by the receiving end. TSCF control messages use a Type Length Value ("TLV") encoding. TLV is a variable length concatenation of a unique type and a corresponding value.

Each TSCF control message includes a control message ("CM") header at the beginning, including a "CM_Version" field identifying the version of the header and indicating the outer transport protocol of a TSCF tunnel, a "CM_Indication" field identifying whether the message is a control message or not, a "Reserved" field reserved for future use, a "CM_Type" field identifying the type of the control message (e.g., whether it is a request or a response, the corresponding functionality, etc.), a "TLV_Count" field indicating the number of TLVs that follow or are appended to the header in the corresponding control message, a "Tunnel Session ID" ("TSID") field including a tunnel session identifier ("ID") assigned by tunneling server 116 to uniquely identify TSCF tunnel 108, and a "Sequence" field that is incremented per message, as described in, for example, 3GPP TR 33.830 V0.5.0.

In one embodiment, in order to establish TSCF tunnel 108, tunneling client 106 sends a "configuration request" message to tunneling server 116 to obtain configuration information for TSCF tunnel 108. In a "configuration request" message, the TSID header field bits are set to 1 (i.e., FFFF . . . ). In response, tunneling server 116 assigns a TSID to a TSCF tunnel and sends a "configuration response" message back to tunneling client 106. The "configuration response" message includes the TSID assigned by tunneling server 116 to TSCF tunnel 108. The subsequent messages between tunneling client 106 and tunneling server 116 include this assigned TSID in their headers.

In one embodiment, if a control message is communicated between tunneling client 106 and tunneling server 116 and does not include the expected TSID, the control message is dropped and the corresponding TSCF tunnel is terminated. Alternatively, in one embodiment, tunneling client 106 may send a "configuration release request" message to tunneling server 116 to terminate a TSCF tunnel. In response to such a "configuration release request" message, tunneling server 116 sends a "configuration release response" message to tunneling client 106. At this time, TSCF tunnel 108 is terminated.

In one embodiment, UE 102 executes an application through a web browser 144 via an operating system interface. The application may be a WebRTC application relying on a library such as the software development kit ("SDK") provided by the Tunneled Session Management ("TSM") solution from Oracle Corp. The TSM solution employs a client/server architecture using session border controllers ("SBCs") and client applications, such as client RTC VPN application 104, that may be developed using the SDK. The client applications initiate secure communications sessions with the service provider over the Internet. The session border controllers (e.g., implemented by tunneling server 116) at the edge of the network terminate and control the tunnels before passing the secure traffic into the service core of service provider network 122. In one embodiment, SDKs are implemented by client RTC VPN 104 and/or a server RTC application 120. The SDK in general provides additional APIs beyond "standard" TSCF APIs in order to implement the functionality disclosed herein.

UE 102 further communicates with another UE 130, for example in conducting a VoIP telephone call in which media packets (e.g., voice packets or video packets) are transmitted and received using WebRTC. Both UE 102 and UE 130 communicate with a web server 124 through web browser 144, 134 respectively, in a known manner to access a WebRTC application through an API. In another embodiment, UE 102 and UE 130 can communicate with different web servers that are coordinated since they are in charge of forwarding call requests between UEs. Further, UE 102 includes two interfaces through tunneling client 106 via client RTC VPN 104. One interface is the operating system ("OS") to which it is running, and the other is an interface to tunneling client 106 to access tunnel 108. In another embodiment, client RTC VPN 104 is implemented by being integrated as functionality inside web browser 144 itself. In this embodiment, the web browser source code is available or the web browser provides plug-in support with full access to traffic.

Figure 2:
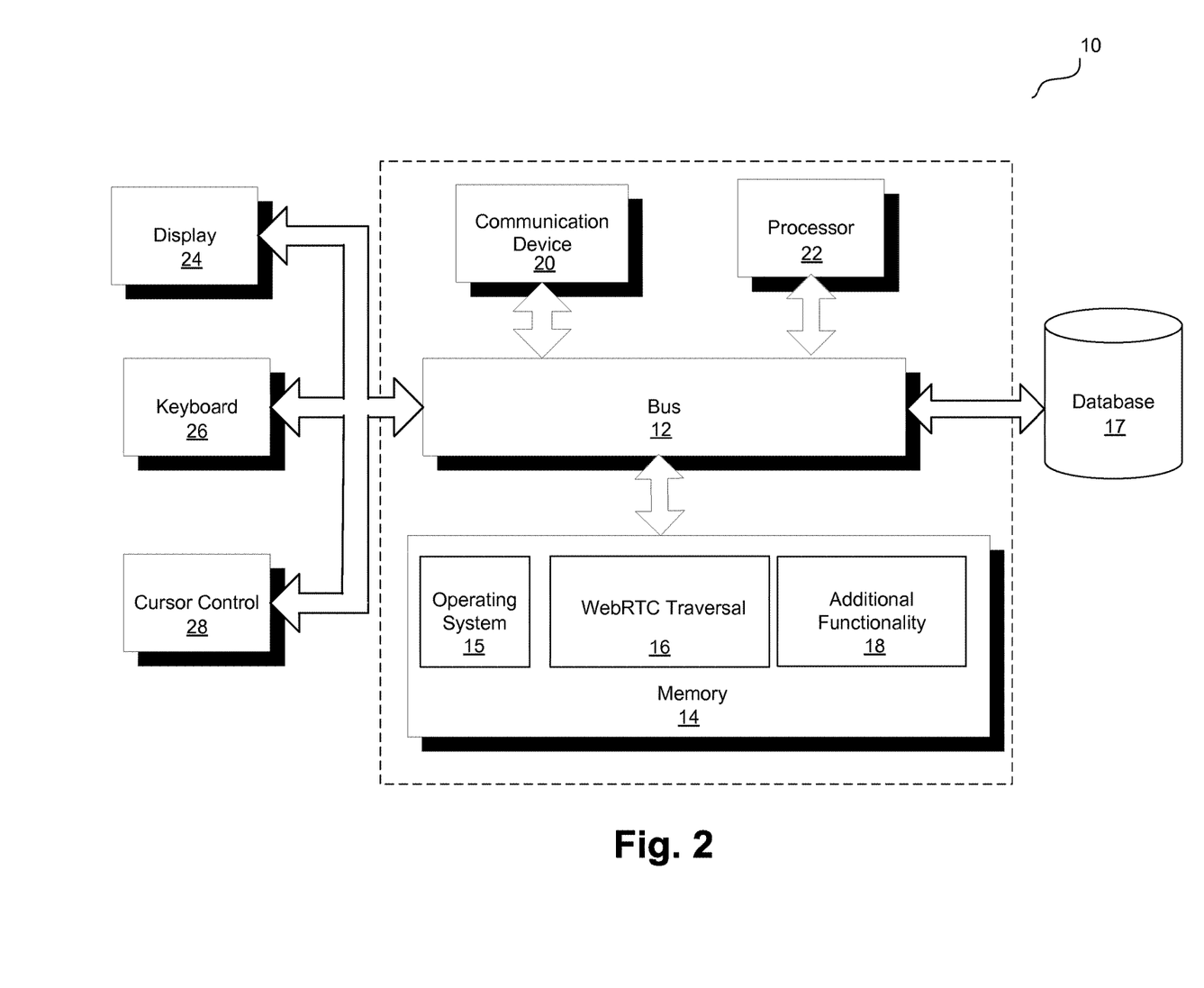
FIG. 2 is a block diagram of a computer server/system in accordance with an embodiment of the present invention.

FIG. 2 is a block diagram of a computer server/system (i.e., system 10) in accordance with an embodiment of the present invention. System 10 can be used to implement any of the network elements shown in FIG. 1 as necessary in order to implement any of the functionality of embodiments of the invention disclosed in detail below. Although shown as a single system, the functionality of system 10 can be implemented as a distributed system. Further, the functionality disclosed herein can be implemented on separate servers or devices that may be coupled together over a network. Further, one or more components of system 10 may not be included. For example, for the functionality of tunneling client 106 of FIG. 1, system 10 may be a server that in general has no need for a display 24 or one or more other components shown in FIG. 2.

System 10 includes a bus 12 or other communication mechanism for communicating information, and a processor 22 coupled to bus 12 for processing information. Processor 22 may be any type of general or specific purpose processor. System 10 further includes a memory 14 for storing information and instructions to be executed by processor 22. Memory 14 can be comprised of any combination of random access memory ("RAM"), read only memory ("ROM"), static storage such as a magnetic or optical disk, or any other type of computer readable medium. System 10 further includes a communication device 20, such as a network interface card, to provide access to a network. Therefore, a user may interface with system 10 directly, or remotely through a network, or any other method.

Computer readable medium may be any available media that can be accessed by processor 22 and includes both volatile and nonvolatile media, removable and non-removable media, and communication media. Communication media may include computer readable instructions, data structures, program modules, or other data in a modulated data signal such as a carrier wave or other transport mechanism, and includes any information delivery media.

Processor 22 may further be coupled via bus 12 to a display 24, such as a Liquid Crystal Display ("LCD"). A keyboard 26 and a cursor control device 28, such as a computer mouse, may further be coupled to bus 12 to enable a user to interface with system 10 on an as needed basis.

In one embodiment, memory 14 stores software modules that provide functionality when executed by processor 22. The modules include an operating system 15 that provides operating system functionality for system 10. The modules further include a WebRTC traversal module 16 for providing functionality for transmitting WebRTC media across a VPN tunnel, and all other functionality disclosed herein. In one example embodiment, WebRTC traversal module 16 may implement tunneling client 106 of FIG. 1 in conjunction with one or more remaining elements of FIG. 2. System 10 can be part of a larger system, such as added functionality to the "Acme Packet 4500" session border controller from Oracle Corp. Therefore, system 10 can include one or more additional functional modules 18 to include the additional functionality. A database 17 is coupled to bus 12 to provide centralized storage for redundant encoding module 16 and additional functional modules 18.

In one embodiment, WebRTC traversal module 16 and/or additional functional modules 18 may include several modules to provide the WebRTC traversal functionality. The modules in one embodiment include a tunneling module that establishes a tunnel with a tunneling client of a user equipment, a media detection module for detecting media packets, and an enhancement module for enhancing the quality of the media streams transmitting through the tunnel.

Referring again to FIG. 1, with known systems, TSCF tunnel 108 may encapsulate different types of traffic ranging from pure data to real-time media. In general, data and real-time media are subject to different Quality of Service ("QoS") requirements. For example, data may be sensitive to integrity while real-time media may be sensitive to latency. In a tunneling configuration, encapsulated (i.e., in a packet/frame) media is typically communicated according to the real-time transport protocol ("RTP" as provided, for example, in IETF RFC 3550).

Figure 3:
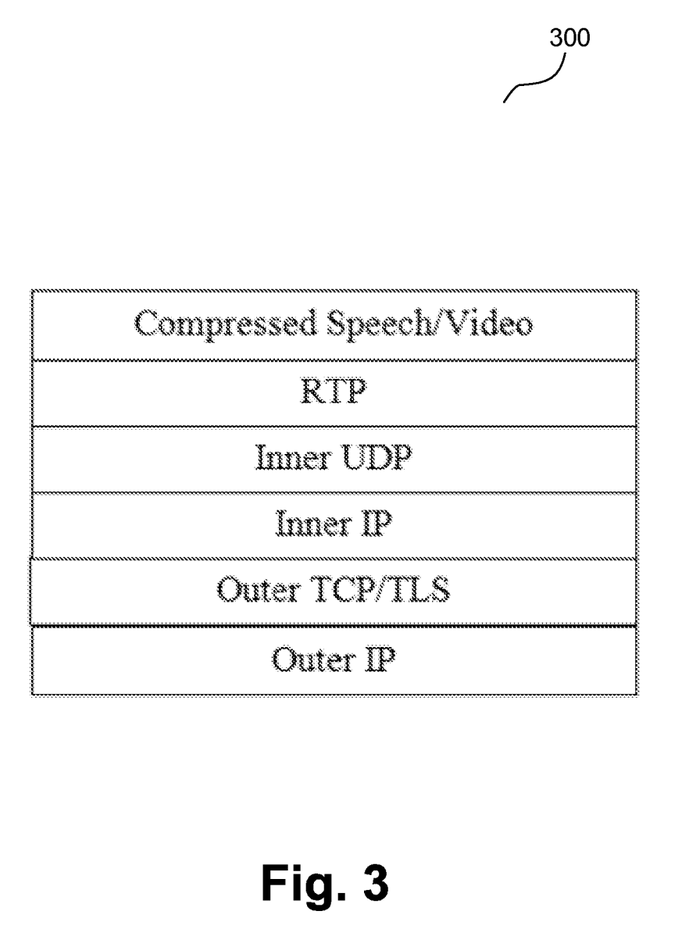
FIG. 3 illustrates example protocol layers in a Tunneled Services Control Function tunneling configuration for encapsulating media traffic according to an embodiment.

In a TSCF tunneling configuration, RTC (e.g., speech, video, etc.) may be subject to two levels of transport: one at the outer tunnel layer typically according to TCP/TLS, and another at the inner tunnel layer typically according to UDP. FIG. 3 illustrates example protocol layers in a TSCF tunneling configuration 300 for encapsulating media traffic according to an embodiment. In TSCF tunneling configuration 300, compressed media (e.g., speech, video, etc.) is communicated according to RTP at the application layer, and is transported via an inner UDP at the inner transport layer within an inner IP at the inner network layer. The inner layers are within an outer TCP/TLS at the outer transport layer which is in turn within an outer IP at the outer network layer. In one embodiment, since most IP networks block any outer traffic that is not stream-based, TCP/TLS is used at the outer transport layer of TSCF tunnel 108 to guarantee delivery.

As disclosed, embodiments integrate VPN support in TSCF in order to apply a rich set of media within the tunneling architecture so that low cost traversal of WebRTC media through firewalls is possible. In one embodiment, client RTC VPN 104 exists as a separate entity that assigns a new virtual network interface to the OS under which is running (i.e., the OS of UE 102) and adds routing rules to direct all IP traffic through it. Further, client RTC VPN 104 uses TSCF software development kit ("SDK") low level APIs to encapsulate all IP traffic via tunneling client 106 in one embodiment. In one embodiment, UE 102 executes client RTC VPN 104 that may be a SIP based RTC application relying on a library such as the SDK provided by the tunneled session management solution from Oracle Corp. The TSCF SDK provides a Berkeley software distribution ("BSD")-like socket API that can be used to send and receive encapsulated media using the "tsc_sendto" and "tsc_recvfrom" functions, respectively.

In one embodiment, client RTC VPN 104 establishes a standard TSCF tunnel at set up time and uses its assigned IP address as the address of the new virtual network interface. Whenever incoming frames are received from browser 144 by client RTC VPN 104, the frames are encapsulated and forwarded to tunnel 108 by RTC VPN 104. Conversely, whenever incoming frames are received from tunnel 108 by RTC VPN 104, the frames will be de-encapsulated and forwarded to browser 144.

In one embodiment, client RTC VPN 104 detects media (e.g., speech and video) traffic automatically. Further, in one embodiment, client RTC VPN 104 is configured to improve the quality of detected media by implementing forward error correction ("FEC"). Further, in one embodiment, client RTC VPN 104 is configured to improve the quality of detected media by implementing dynamic datagram tunnels ("DDT"). Further, in one embodiment, client RTC VPN 104 is configured to improve the quality of detected media by implementing TSCF header compression.

Further, in one embodiment, client RTC VPN 104 is configured to improve the quality of detected media and improve signaling quality by implementing concealed datagram transport of real time media. Further, in one embodiment, client RTC VPN 104 is configured to improve the quality of detected media by implementing congestion control of encapsulated media. Still further, in one embodiment, client RTC VPN 104 is configured to improve the quality of detected media by implementing multipath transmission of encapsulated media.

TSCF RTC VPN Flow

Figure 4:
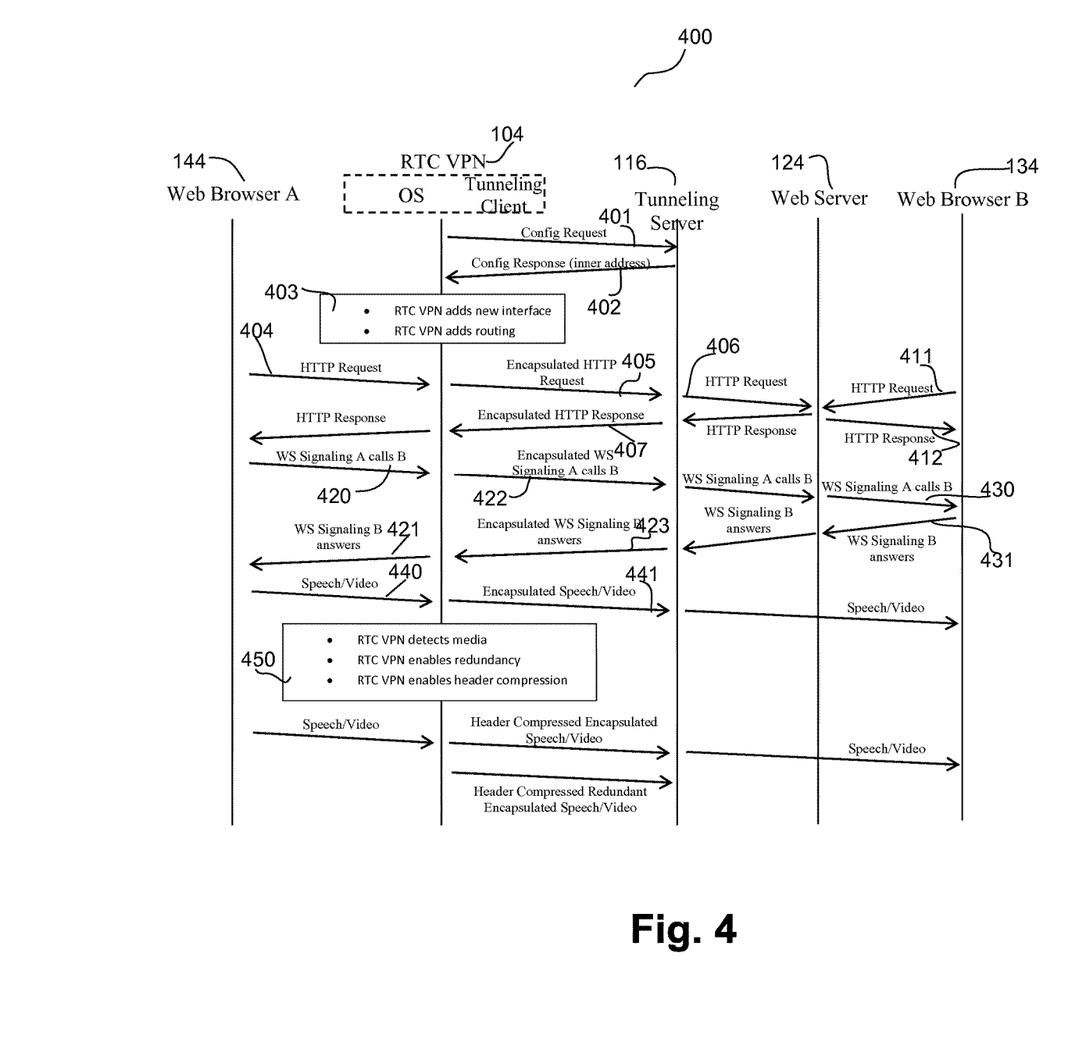
FIG. 4 is an example message sequence diagram, including the sequence of messages exchanged between performing WebRTC tunnel traversal according to some embodiments.

FIG. 4 is an example message sequence diagram 400, including the sequence of messages exchanged between performing WebRTC tunnel traversal according to some embodiments. FIG. 4 includes messages exchanged between network elements including web browser A 144 of UE 102, client RTC VPN 104, tunneling server 116, web server 124 and web browser B 134 of UE 130, as described herein with reference to FIG. 1.

Initially, client RTC VPN 104 creates tunnel 108 by executing a "tsc_ctrl_new_tunnel" API. Internally, client 106 generates a tunnel config request 401 that is responded by server 116 with a tunnel config response 402.

Client RTC VPN 104 processes the response at 403 by extracting the internal IP parameters and executing OS APIs in order to create a new network interface and add a new entry to the system IP routing table. Client RTC VPN 104 adds the new interface and new routing table entries utilizing OS APIs. The IP routing table is needed to force web browser 144 to route all traffic to go through the tunnel 108. The routing table maps a destination IP address (such as that of web browser 144) to a specific interface (such as that created by client RTC VPN 104).

Client web browser A 144 then accesses the WebRTC application running on web server 124 and generates Hypertext Transfer Protocol ("HTTP") traffic 404 that is encapsulated by client 106 (by means of the "tsc_send_data" low level API) at 405 as it traverses tunnel 108 and then de-encapsulated at 406. An example of web browser A 144 accessing the WebRTC application may be when a user is on a web site that has a button that initiates a telephone call with an agent. By selecting the button, a WebRTC application may be initiated in order to initiate the voice call. Web server 124 sends an HTTP response to web browser A 144 that is encapsulated by server 116 at 407 as it traverses tunnel 108.

Further, web browser B 134 at the other UE accesses a WebRTC application running on web server 124 at 411. Web server 124 sends an HTTP response to web browser B 134 at 412.

Client web browser A's downloaded WebRTC code generates WebSocket ("WS") traffic that is used to initiate a call to web browser B at 420. As WS traffic traverses tunnel 108, it is encapsulated by tunneling client 106 (by means of the "tsc_send_data" low level API) at 422 and 423.

Client web browser B's downloaded WebRTC code generates WS traffic that is used to answer the call request from web browser A at 430 and 431.

Client web browser A's downloaded WebRTC code then initiates a media RTP session to client web browser B using WebRTC APIs at 440. Media is encapsulated by client 106 (by means of the "tsc_send_data" low level API) as it traverses tunnel 108 at 441.

If, for example, RTC VPN 104 is configured with header compression and redundancy support, when RTP frames are detected, those features are automatically enabled on the corresponding inner socket in which the media flows. Media traversing the tunnel that is subjected to both header compression and redundancy at 450 improves the overall real time communication quality experienced by users on web browsers A and B.

RTC VPN Data Flow

Once RTC VPN tunnel 108 is established between tunneling client 106 and tunneling server 116, and an internal IP address, a mask and a default gateway are assigned, embodiments add a network interface in the OS of UE 102 and an IP routing entry is created in order to route all outgoing traffic through tunnel 108. The following shows the routing table once a new entry is created for an interface assigned to internal IP address 182.168.31.40 and default gateway 182.168.31.1 in accordance with one embodiment:

| IPv4 Route Table Active Routes: | | | | |
|---|---|---|---|---|
| Network Destination | Netmask | Gateway | Interface | Metric |
| 0.0.0.0 | 0.0.0.0 | 182.168.31.1 | 182.168.31.40 | 1 |

As shown, the network destination 0.0.0.0 with netmask 0.0.0.0 and metric value 1 forces all traffic to go inside tunnel 108 by means of interface 182.168.31.40.

One embodiment uses OS APIs (i.e., the TUN/TAP Unix API) in order to access all IP frames sent by third party applications (e.g., a web browser) through the new route and, in turn, have RTC VPN 104 encapsulate those frames using the tsc_send_data TSCF low level API. This function guarantees transparent and efficient insertion of all layer 2 frames inside the tunnel. Similarly, frames that are untunneled by client 106 in RTC VPN 104 are transmitted back to the third party application via the new interface.

RTC VPN Media Detection

Figure 5:
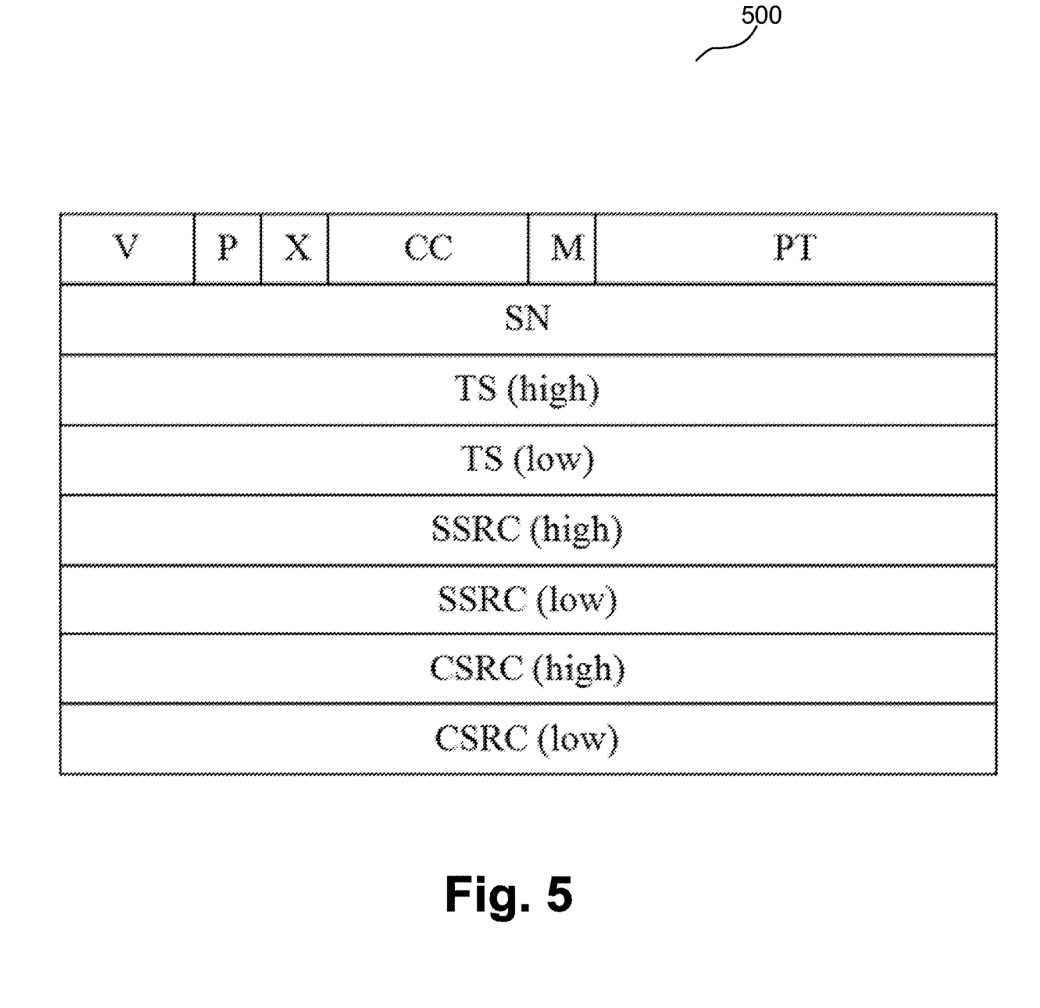
FIG. 5 shows an example Real-time Transport Protocol header configuration in the tunneling configuration of FIG. 3.

The RTP headers identify the presence of real-time media traffic in tunnel 108. FIG. 5 shows an example RTP header configuration 500 in tunneling configuration 300 of FIG. 3. In one embodiment, client RTC VPN 104 performs media detection by analyzing all inner datagram packets and determining whether they contain RTP headers. RTP header configuration 500 includes a Version field (denoted as "V") indicating the version of the protocol, a Padding field (denoted as "P") indicating if there are extra padding bytes at the end of the RTP packet, an Extension field (denoted as "X") indicating presence of an extension header between standard header and payload data, a Contributing source ("CSRC") count field (denoted as "CC") indicating the number of CSRC identifiers that follow the fixed header, a Marker field (denoted as "M") used at the application level, a Payload Type field (denoted as "PT") indicating the format of the payload, a Sequence Number field (denoted as "SN") incremented by one for each RTP data packet sent a Timestamp field (denoted as "TS(high)" and "TS(low)") used to enable the receiver to play back the received samples at appropriate intervals, a Synchronization Source ("SSRC") field (denoted as "SSRC(high)" and "SSRC(low)") uniquely identifying the source of a stream, and a CSRC field (denoted as "CSRC(high)" and "CSRC(low)") indicating the contributing source identifiers.

In RTP header configuration 500, fields V, SSRC, and PT are fixed for every media stream, and field SN is a 32 bit number that increases with every packet being transmitted. Accordingly, in one embodiment, client RTC VPN 104 may detect a media stream in TSCF tunnel 108 when a sequence of consecutive frames have headers with the same V, SSRC, and PT fields, and each header in the sequence has an SN field that is larger than the SN field of the previous header by one. In one embodiment, client RTC VPN 104 may examine a certain number of consecutive frames (e.g., 5 frames) before indicating a media stream, or otherwise data, in TSCF tunnel 108. Similarly, when a sequence of consecutive frames have headers that do not match the format expected of consecutive RTP headers, client RTC VPN 104 may detect pure data in TSCF tunnel 108.

In one embodiment, client 106 detects a traffic pattern in TSCF tunnel 108 (e.g., a media stream or otherwise pure data) according to the following example functionality:

```
Initialization:
    lastV = 0
    lastSSRC = 0
    lastPT = 0
    lastSN = 0
    count1 = 0
    count2 = 0
    state = DATA
end
OnIncomingPacket(pkt):
    If (pkt.V == lastV AND
        pkt.SSRC == lastSSRC AND
        pkt.PT == lastPT AND
        pkt.SN == lastSN + 1) then
            lastV = pkt.V
            lastSSRC = pkt.SSRC
            lastPT = pkt.PT
            lastSN = pkt.SN
            count1 = count1 + 1
            if (state == DATA AND count1 >
            COUNT_THRESHOLD) then
                OnMediaDetectedCallback( )
                state = MEDIA
            end
            count2 = 0
    else
            count2 = count2 + 1
            if (state == MEDIA AND count2 >
            COUNT_THRESHOLD) then
                OnDataDetectedCallback( )
                state = DATA
            end
            count1 = 0
    end
end
```

In the above functionality, "COUNT_THRESHOLD" is a pre-configured number (typically 5). Once client RTC VPN 104 detects media or data in TSCF tunnel 108, it notifies server RTC 120 at tunneling server 116. Additional details on how media detection is performed by client RTC VPN 104 are disclosed in U.S. patent application Ser. No. 14/698,077, the disclosure of which is hereby incorporated by reference.

Once a specific media stream is detected, as disclosed above, client RTC VPN 104, based on configuration settings, can apply different media improvement mechanisms on the media stream. These improvements include media redundancy, dynamic datagram tunnels ("DDT"), header compression, concealed datagram transport, congestion control and multipath support. Additional details of the media improvements are discussed below.

Media Redundancy

In one embodiment, if forward error correction is enabled in client RTC VPN 104, and media is detected on an inner socket, media redundancy is negotiated on that socket as per a TSCF media redundancy mechanism. Embodiments, before transmitting encapsulated media, or frames, over a tunnel, determine if the same or redundant frame has previously been sent. If so, a sequence/reference number is substituted for the redundant frame. The redundant encoding functionality can be implemented at client RTC VPN 104, with the corresponding decoding functionality implemented at server RTC 120.

In one embodiment, a ring buffer or circular buffer is included at client 106 and server 116 in order to implement the functionality. A ring buffer is a data structure that uses a single, fixed-size buffer as if it were connected end-to-end, and allows for the buffering of data streams. In other embodiments, other types of buffers can be used.

In one embodiment, either or both of client 106 or server 116 ring buffer up to "N" frames as they are encapsulated, where N is the buffer size. In one embodiment, each buffered frame, in addition, is stored alongside an MD5 hash or other type of cryptographic hash function for fast classification.

In one embodiment, client 106 requests the redundant traffic encoding functionality through a TSCF service request. Server 116, based on available memory resources, determines the buffer size N and informs client 106 through a TSCF service response. One embodiment provides TSCF SDKs that support API so that client RTC VPN 104 can enable redundant traffic encoding for a specific inner socket. For example, client RTC VPN 104 may enable redundant traffic encoding at tunneling client 106 for an inner socket by executing a corresponding "tsc_setsockopt" API (i.e., a set socket API) with a corresponding new socket option when an inner socket is created.

In one embodiment, whenever a frame is to be encapsulated, both client 106 and server 116 calculate the MD5 hash of the frame and compare it against those of the buffered ones. If a match is found, both frames are also compared on a byte-by-byte basis to determine if they are identical. If so, rather than tunneling the frame, a reference to the stored frame is encapsulated instead.

Depending on latency constraints, both client 106 and server 116 process a multiple number of frames simultaneously in order to minimize the overhead due to the encapsulation of inner network and transport headers. Whenever redundant encoding is enabled on a given socket, client 106 notifies client RTC VPN 104, if configured, by means of the "tsc_notification_enable" API.

In one embodiment, an encoder, whether located at client 106 or server 116, or both, keeps track of incoming frames, queuing them in a ring or circular buffer and simultaneously verifying whether the same frame content has been already stored. If a match is found, instead of encapsulating the whole frame, a reference or index within the buffer is encapsulated. A decoder, typically located at server 116, also keeps track of detunneled frames by buffering them into its own ring or circular buffer even when a reference is received. Because embodiments rely on synchronization between encoder and decoder, stream transport is needed for transmission of frames and references in one embodiment.

To improve computational performance, and improve the performance of the server/computer, the search process is done in two stages in one embodiment: (1) an MD5 hash is used to find all frames with a similar pattern weight; and (2) a byte-to-byte comparison is then performed. The encoder maps each hash to its corresponding frame.

The following pseudocode is an example of the redundant encoding functionality in accordance to one embodiment:

```
rteEncode(frame):
    hash = MD5(frame)
    index = -1
    do
        index = queue.find(hash)
        if (index ≠ -1)
            if (compare(frame, queue.get(index)))
                break
            endif
        endif
    while (index ≠ -1)
    if (index ≠ -1)
        tunnel.send(index)
    else
        tunnel.send(frame)
    endif
    queue.push(hash, frame)
```

The above pseudocode describes the rteEncode function that is used to encode a single frame, where "queue" represents the circular or ring buffer of size N, "tunnel" represents the tunnel client object, and "MD5" is the function that calculates the MD5 hash.

Additional details on how media redundancy is performed by client RTC VPN 104 are disclosed in U.S. patent application Ser. No. 14/831,182, the disclosure of which is hereby incorporated by reference.

Dynamic Datagram Tunnels ("DDT")

If DDT is enabled in client RTC VPN 104, and media is detected on an inner socket, dynamic datagram tunnels ("DDT") are negotiated for that socket as per a TSCF DDT mechanism. In one embodiment, client RTC VPN 104 provides RTC services in a network environment by establishing the DDT that carries real time media traffic between end users and remote servers, while traversing security devices such as firewalls. Accordingly, by traversing security devices, this embodiment provides secure RTC services. Further, by using a datagram tunnel, this embodiment addresses RTC requirements such as call quality (which may be affected by impairments such as latency, packet loss, and/or jitter).

One embodiment supports two concurrent tunnels: a stream based tunnel (i.e., tunnel 108 of FIG. 1) for communicating a first channel for signaling traffic, and a dynamic datagram tunnel ("DDT") (not shown in FIG. 1) for communicating a second channel for media traffic. A datagram is a basic transfer unit associated with a packet-switched network. For such datagram, the delivery, arrival time, and order of arrival need not be guaranteed by the network. In this embodiment, the stream based tunnel may use a stream based protocol such as TCP or a Transport Layer Security ("TLS") protocol, while the DDT may use a protocol appropriate for media such as a User Datagram Protocol ("UDP") or a Datagram Transport Layer Security ("DTLS") protocol.

In one embodiment, DDT service is activated at tunneling client 106 (via client RTC VPN 104) and tunneling server 116 according to the following functionality:

Client RTC VPN 104 creates one TCP based or TLS based "always on" regular tunnel (i.e., stream based tunnel 108). For example, a TSM library at client RTC VPN 104 creates the stream based tunnel by executing a corresponding application programming interface ("API").

Once a SIP call is established on the stream based tunnel and RTP is negotiated by Session Description Protocol ("SDP") information exchange, an RTP media socket is created on the stream based tunnel by executing a corresponding API. SDP is a format for describing streaming media initialization parameters.

To induce the DDT on RTP media socket, it is marked to run on a new separate datagram tunnel, by executing a corresponding API on an RTP media socket to set a related parameter.

When a binding function is executed on RTP media socket and since it resides on the stream based tunnel 108, a client state machine ("CSM") at tunneling client 106 sends a TSCF service request to tunneling server 116 to initiate DDT services.

When tunneling server 116 receives the TSCF service request, it reserves a new datagram tunnel (i.e., the DDT) which is UDP or DTLS based if the stream based tunnel is TCP or TLS based, respectively. Tunneling server 116 sends a service response back to tunneling client 106 indicating the TSCF tunnel identifier ("TID") of the DDT.

The CSM then negotiates the DDT by sending a configuration request and processing the corresponding response. At this point, the CSM moves RTP media socket from the stream based tunnel to the DDT.

While the DDT is being negotiated and until the RTP media socket is moved from the stream based tunnel to the DDT, all traffic sent/received by the RTP media socket is sent on the stream based tunnel.

When the stream based tunnel is terminated (i.e., by executing an API) the DDT is also terminated. If connectivity brings down the stream based tunnel or the DDT, the CSM mechanism to reestablish connectivity will try to bring either tunnel back up.

Additional details on how DDT is performed by client RTC VPN 104 are disclosed in U.S. patent application Ser. No. 14/519,519, the disclosure of which is herein incorporated by reference.

Header Compression

If header compression is enabled in client RTC VPN 104, and media is detected on an inner socket, the functionality is negotiated on that socket as per a TSCF header compression mechanisms. Embodiments of the present invention allow for header compression at the inner UDP layer within a tunneling configuration. In one embodiment, the inner IP and transport headers are replaced with much shorter indices (typically 3 or 4 bytes each) in order to dramatically improve the overall transmission throughput of TSCF tunnel 108. One embodiment first detects redundancy in header transmission, and then adaptively enables or disables header compression accordingly and without client application intervention. Thus, embodiments reduce the required bandwidth for media communication (for example, 12% reduction in required bandwidth for a high bit rate codec such as the ITU G.711 codec, and 65% reduction in required bandwidth for a low bit rate codec such as the AMR codec).

In one embodiment, the header compression functionality is provided based on a bi-directional mapping between each index and a corresponding sequence of inner IP and transport headers. That is, each index corresponds to a specific IP header and transport header (i.e., a sequence of headers), thus a one-to-one mapping is provided between an index and two headers. In one embodiment, the mapping functionality is implemented at client RTC VPN 104 and at server RTC 120. Based on the mapping, client RTC VPN 104 and server RTC 120 perform mapping between IP and transport headers of the inner UDP of media traffic and corresponding indices.

For example, when a media packet is transmitted from UE 102 to tunneling server 116, client RTC VPN 104 replaces the IP and transport headers of the inner UDP of the packet with a corresponding index according to the mapping received from tunneling client 106 for the corresponding RTC. Upon reception of the packet by tunneling server 116, server RTC 120 replaces the index with corresponding IP and transport headers according to the mapping.

In one embodiment, the mapping between the inner IP and transport headers and the corresponding indices is based on a hash map. In one embodiment, TSCF tunnel 108 supports up to 256 individual mappings between indices and headers. That is, tunneling server 116 stores a table with 256 entries, where each entry relates an index to an IP header and a transport header (i.e., a sequence of IP and transport headers), thus providing a one-to-one mapping.

One embodiment provides control messages for communicating compressed header media traffic encapsulated within TSCF tunnel 108. One embodiment provides a TSCF service request control message to enable header compression functionality. In this embodiment, when RTC traffic endpoints have fixed IP address and transport ports, tunneling client 106 sends a TSCF client service request message of type "Enable_Header_Compression" to tunneling server 116, including TSCF client connection information TLVs that identify source and destination endpoints. Subsequently, tunneling server 116 maps this connection information (i.e., IP addresses and transport ports) into an index (for example, an 8-bit index) and sends a TSCF service response control message of type "Enable_Header_Compression" back to tunneling client 106, including a header compression index TLV that indicates the index value that tunneling client 106 should use to identify the corresponding sequence of headers. Thereafter, tunneling client 106 or tunneling server 116 communicate media traffic with inner IP and transport headers replaced with a compressed header (i.e., the index).

In one embodiment, the length of the compressed header is based on the payload size. In one non-limiting example embodiment, the compressed header is either 3 bytes or 4 bytes depending on the amount of data to be sent. Tables 1 and 2 provide example media packet configurations with such compressed headers.

TABLE 1

| 0x70 | index | length |
|------|-------|--------|

An Example Media Packet Configuration with a 3-Byte Compressed Header

TABLE 2

| 0x71 | index | length (high) | length (low) |
|------|-------|---------------|--------------|

An Example Media Packet Configuration with a 4-Byte Compressed Header

In the example configuration of Table 1, a 3-byte compressed header is used for payload lengths smaller than 256 bytes. In the example configuration of Table 2 a 4-byte header is used for payload lengths between 256 and 65535 bytes.

Additional details on how header compression is performed by client RTC VPN 104 are disclosed in U.S. patent application Ser. No. 14/637,550, the disclosure of which is hereby incorporated by reference.

Concealed Datagram Transport

In one embodiment, if concealed datagram transport is enabled in client RTC VPN 104, and media is detected on an inner socket, the functionality is negotiated on that socket as per TSCF concealed datagram transport mechanisms. In embodiments that implement concealed datagram transport, a new outer transport protocol is provided, referred to as "CDP", that behaves as a datagram-based transport (e.g., a UDP transport) but uses the same header configuration as a stream-based protocol (i.e., uses a stream-based header) to present itself to the IP network as stream-based traffic (e.g., TCP traffic). In some embodiments, tunneling client 106 and tunneling server 116 understand CDP, but to the intermediate devices that only inspect specific fields of transport headers, CDP traffic appears as stream-based traffic and therefore is not affected by filtering rules that allow stream-based traffic. Accordingly, CDP tunneled traffic may transit through a public IP network and traverse firewalls as stream-based traffic.

In one embodiment, client RTC VPN 104 at tunneling client 106 and server RTC 120 at tunneling server 116 provide outer transport CDP functionality such that their respective underlying TCP stacks behave as UDP but with the UDP header replaced by a "fake" TCP header that conceals the real datagram identity of the traffic. In one embodiment, client RTC VPN 104 supports outgoing CDP-based tunnels while server RTC 120 supports incoming CDP-based tunnels. That is, client RTC VPN 104 is a tunnel client and therefore generates outgoing tunnel requests, while server RTC 120 is a tunnel server and therefore receives such requests. Accordingly, by implementing client RTC VPN 104 and server RTC 120, tunneling client 106 and tunneling server 116 may establish and manage a concealed datagram-based tunnel 108 with CDP as its outer transport protocol.

In one embodiment, tunneling client 106 uses the same inner socket application programming interfaces ("APIs") for CDP transport and stream-based transport, but uses different outer tunnel creation APIs for CDP transport and stream-based transport. Accordingly, the usage of CDP for transport is transparent to client RTC VPN 104.

Additional details on how concealed datagram transport is performed by client RTC VPN 104 are disclosed in U.S. patent application Ser. No. 14/657,227, the disclosure of which is hereby incorporated by reference.

Multipath Support

In one embodiment, if multipath support is enabled in client RTC VPN 104, and media is detected on an inner socket, the functionality is negotiated on that socket as per TSCF multipath support mechanisms. Embodiments leverage the fact that most mobile devices, or other client devices, support multiple radio or physical interfaces (e.g., Wi-Fi, LTE, etc.), and therefore can be used to simultaneously route tunneled traffic through multiple radio or physical interfaces. In other words, a tunneling client (such as tunneling client 106 of FIG. 1) and a tunneling server (such as tunneling server 116 of FIG. 1) can create multiple tunnels, chunk media traffic, and distribute the chunked media traffic among the available tunnels based on fixed ratios or QoS metrics, such as packet loss, jitter, bit rate, bit error rate, end-to-end delay, RTT, etc.

One embodiment provides multipath support functionality through client RTC VPN 104 at tunneling client 106 and server RTC 120 at tunneling server 116. In this embodiment, client RTC VPN 104 sends a request to enable multipath support on a specific inner socket. Further, client RTC VPN 104 determines whether it has access to multiple physical interfaces, and sends a request to enable multipath support to server RTC 120, where the request to enable multipath support includes a number of available physical interfaces identified by client RTC VPN 104. In this embodiment, client RTC VPN 104 and server RTC 120 may have already established TSCF tunnel 108. In response to receiving the request to enable multipath support, server RTC 120 reserves one or more additional TSCF tunnels (not shown in FIG. 1) with the same characteristics as any original TSCF tunnels, such as TSCF tunnel 108. client RTC VPN 104 subsequently creates the one or more reserved additional TSCF tunnels and distributes inner socket traffic among the available TSCF tunnels. Further, server RTC 120 also distributes inner socket traffic among the available TSCF tunnels. Further, whenever multipath TSCF tunnels are created, tunneling client 106 notifies client RTC VPN 104 of the multipath TSCF tunnels.

Additional details on how multipath support is performed by client RTC VPN 104 are disclosed in U.S. patent application Ser. No. 14/734,300, the disclosure of which is hereby incorporated by reference.

Figure 6:
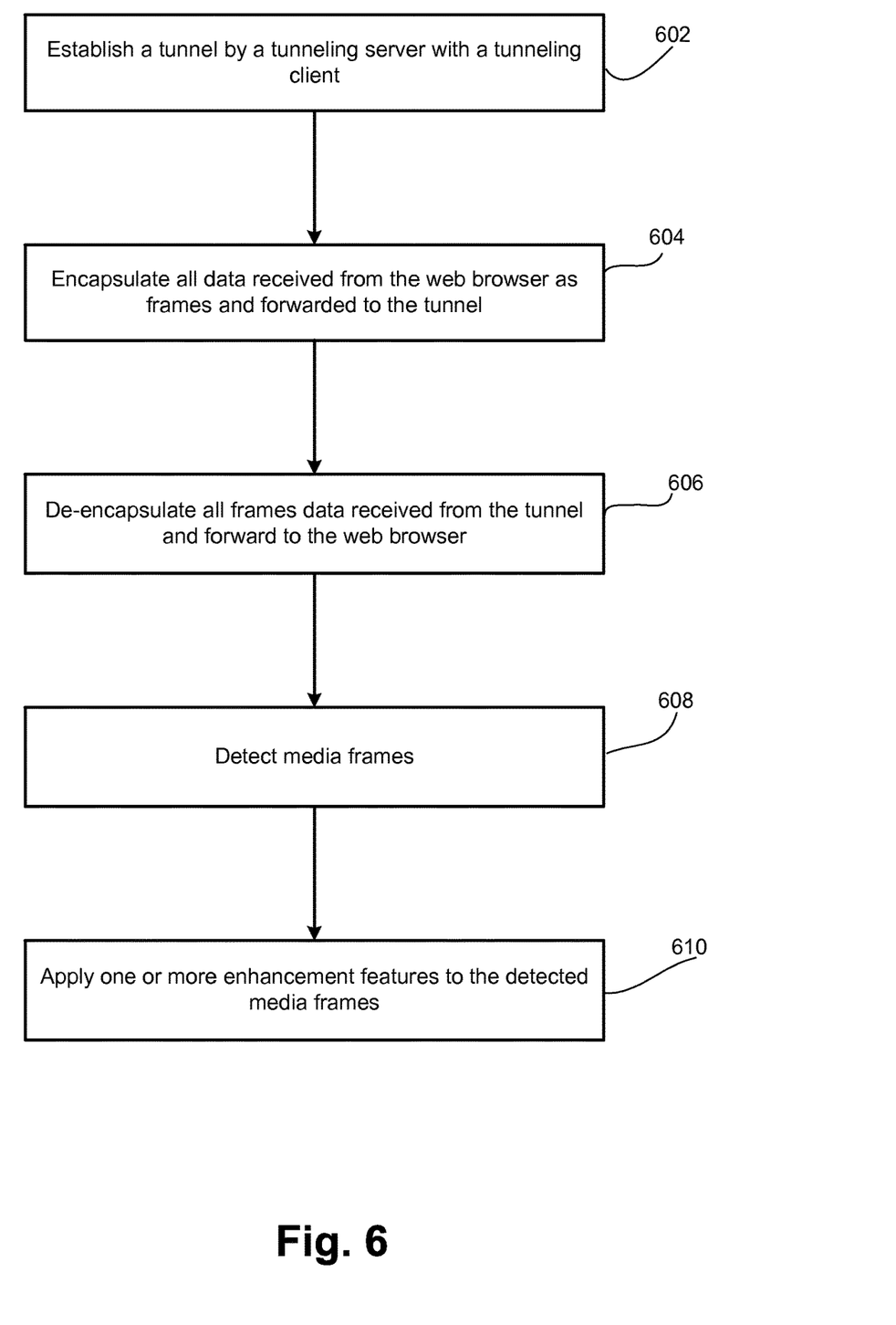
FIG. 6 is a flow diagram of the WebRTC traversal module of FIG. 2 and/or the tunneling client and tunneling server of FIG. 1 when performing WebRTC traversal in accordance with embodiments of the present invention.

FIG. 6 is a flow diagram of WebRTC traversal module 16 of FIG. 2 and/or tunneling client 106 and tunneling server 116 of FIG. 1 when performing WebRTC traversal in accordance with embodiments of the present invention. In one embodiment, the functionality of the flow diagram of FIG. 6 is implemented by software stored in memory or other computer readable or tangible medium, and executed by a processor. In other embodiments, the functionality may be performed by hardware (e.g., through the use of an application specific integrated circuit ("ASIC"), a programmable gate array ("PGA"), a field programmable gate array ("FPGA"), etc.), or any combination of hardware and software.

At 602, tunneling client 106 and tunneling server 116 establish TSCF tunnel 108. Tunnel 108 can include multiple inner sockets, such as a separate inner socket for speech data, video data, etc.

At 604, all data received from web browser 144 are encapsulated as frames and forwarded to tunnel 108. In one embodiment, the inner IP frames originated by web browser 144 are encapsulated by tunneling client 106 and become bigger outer frames containing an extra set of outer network and transport layer headers.

At 606, all frames received from tunnel 108 are de-encapsulated before being forwarded to web browser 144.

At 608, media (e.g., speech and video) frames are detected.

At 610, for media frames, one or more enhancement features are applied to the media frames to improve quality and/or reduce bandwidth. The enhancement features include media redundancy, dynamic datagram tunnels, header compression, concealed datagram transport, congestion control and/or multipath support.

As disclosed, embodiments deliver high quality media of encapsulated media streams in the context of a VPN. Embodiments automatically detect media streams inside a tunnel, apply one or more media quality improvement mechanisms to the detected media streams, and provide a smooth interface against web browsers and other standalone applications for support under WebRTC.

Several embodiments are specifically illustrated and/or described herein. However, it will be appreciated that modifications and variations of the disclosed embodiments are covered by the above teachings and within the purview of the appended claims without departing from the spirit and intended scope of the invention.

What is claimed is:

1. A non-transitory computer readable medium having instructions stored thereon that, when executed by a processor, cause the processor to traverse Web Real-Time Communication (WebRTC) data, the traversing comprising:
    establishing a tunnel between a tunneling client of a user equipment (UE) and a tunneling server;
    accessing, via a web browser at the UE, a WebRTC application executing on a remote web server by transmitting Hypertext Transfer Protocol (HTTP) traffic over the tunnel;
    receiving the WebRTC data from the web browser at the UE;
    encapsulating the WebRTC data into a plurality of frames at the UE;
    before transmitting the plurality of frames over the tunnel from the UE to the tunneling server, detecting at the UE that the plurality of frames comprise either a media stream or non-media data the detecting comprising analyzing inner datagram packets and determining whether they contain real-time transport protocol (RTP) headers, and then examining at the UE a pre-defined number of consecutive headers of the plurality of frames and determining that each of the consecutive headers conform to a RTP format, the plurality of frames detected as the media stream when comprising audio and/or video streaming content;
    wherein the detecting at the UE that the plurality of frames comprise either a media stream or non-media data comprises determining when the pre-defined number of consecutive frames have headers with a same V, SSRC, and PT fields, and each header has an SN field that is larger than the SN field of a previous header by one;
    before transmitting the plurality of frames over the tunnel, when the plurality of frames are detected as the media stream, applying, at the UE, enhancement features to the plurality of frames before the frames are de-encapsulated, and when the plurality of frames are detected as the non-media data, not applying enhancement features; and
    transmitting the plurality of frames over the tunnel, wherein the transmitted frames include the enhancement features when the frames are detected as the media stream.

2. The computer readable medium of claim 1, the traversing further comprising:
    receiving frames from the tunnel;
    de-encapsulating the received frames to provide WebRTC data.

3. The computer readable medium of claim 1, wherein the HTTP traffic traverses one or more security devices.

4. The computer readable medium of claim 1, wherein the tunnel is configured according to a tunneled services control function (TSCF) standard.

5. The computer readable medium of claim 1, wherein the enhancement features comprise at least one of: media redundancy; dynamic datagram tunnels; header compression; concealed datagram transport; congestion control; or multipath support.

6. The computer readable medium of claim 1, the traversing further comprising:
establishing a first interface to an operating system of the UE; and
establishing a second interface to the tunneling client.

7. A method of traversing Web Real-Time Communication (WebRTC) data, the method comprising:
establishing a tunnel between a tunneling client of a user equipment (UE) and a tunneling server;
accessing, via a web browser at the UE, a WebRTC application executing on a remote web server by transmitting Hypertext Transfer Protocol (HTTP) traffic over the tunnel;
receiving the WebRTC data from the web browser at the UE;
encapsulating the WebRTC data into a plurality of frames at the UE;
before transmitting the plurality of frames over the tunnel from the UE to the tunneling server, detecting at the UE that the plurality of frames comprise either a media stream or non-media data, the detecting comprising analyzing inner datagram packets and determining whether they contain real-time transport protocol (RTP) headers, and then examining at the UE a pre-defined number of consecutive headers of the plurality of frames and determining that each of the consecutive headers conform to a RTP format, the plurality of frames detected as the media stream when comprising audio and/or video streaming content;
wherein the detecting at the UE that the plurality of frames comprise either a media stream or non-media data comprises determining when the pre-defined number of consecutive frames have headers with a same V, SSRC, and PT fields, and each header has an SN field that is larger than the SN field of a previous header by one;
before transmitting the plurality of frames over the tunnel, when the plurality of frames are detected as the media stream, applying, at the UE, enhancement features to the plurality of frames before the frames are de-encapsulated, and when the plurality of frames are detected as the non-media data, not applying enhancement features; and
transmitting the plurality of frames over the tunnel, wherein the transmitted frames include the enhancement features when the frames are detected as the media stream.

8. The method of claim 7, further comprising:
receiving frames from the tunnel;
de-encapsulating the received frames to provide WebRTC data.

9. The method of claim 7, wherein the HTTP traffic traverses one or more security devices.

10. The method of claim 7, wherein the tunnel is configured according to a tunneled services control function (TSCF) standard.

11. The method of claim 7, wherein the enhancement features comprise at least one of: media redundancy; dynamic datagram tunnels; header compression; concealed datagram transport; congestion control; or multipath support.

12. The method of claim 7, further comprising:
establishing a first interface to an operating system of the UE; and
establishing a second interface to the tunneling client.

13. A user equipment comprising:
a processor; and
a storage device coupled to the processor that stores a Web Real-Time Communication (WebRTC) traversal module, the WebRTC traversal module, when executed by the processor, implementing modules comprising:
a tunneling module that establishes a tunnel between a tunneling client of a user equipment (UE) and a tunneling server, accesses, via a web browser, a WebRTC application executing on a remote web server by transmitting Hypertext Transfer Protocol (HTTP) traffic over the tunnel, receives WebRTC data from a web browser at the UE and encapsulates the WebRTC data into a plurality of frames;
a media detection module that, before transmitting the plurality of frames over the tunnel from the UE to the tunneling server, detects at the UE that the plurality of frames comprise either a media stream or non-media data, the detecting comprising analyzing inner datagram packets and determining whether they contain real-time transport protocol (RTP) headers, and then examining at the UE a pre-defined number of consecutive headers of the plurality of frames and determining that each of the consecutive headers conform to a RTP format, the plurality of frames detected as the media stream when comprising audio and/or video streaming content, wherein the detecting at the UE that the plurality of frames comprise either a media stream or non-media data comprises determining when the pre-defined number of consecutive frames have headers with a same V, SSRC, and PT fields, and each header has an SN field that is larger than the SN field of a previous header by one; and
an enhancement module that, before transmitting the plurality of frames over the tunnel, when the plurality of frames are detected as the media stream, applying, at the UE, enhancement features to the plurality of frames before the frames are de-encapsulated, and when the plurality of frames are detected as the non-media data, not applying enhancement features, and transmits the plurality of frames over the tunnel, wherein the transmitted frames include the enhancement features when the frames are detected as the media stream.

14. The user equipment of claim 13, wherein the tunnel is configured according to a tunneled services control function (TSCF) standard.

15. The user equipment of claim 13, wherein the enhancement features comprise at least one of: media redundancy; dynamic datagram tunnels; header compression; concealed datagram transport; congestion control; or multipath support.

16. The user equipment of claim 13, wherein the tunneling module further:
establishes a first interface to an operating system of the UE; and
establishes a second interface to the tunneling client.

17. The user equipment of claim 13, wherein the HTTP traffic traverses one or more security devices.

18. The computer readable medium of claim 1, further comprising:
establishing a second tunnel between the tunneling client of a UE and the tunneling server, the second tunnel communicating signaling traffic.

19. The method of claim 7, further comprising:
establishing a second tunnel between the tunneling client of a UE and the tunneling server, the second tunnel communicating signaling traffic.

20. The user equipment of claim 13, the tunneling module further establishing a second tunnel between the tunneling client of a UE and the tunneling server, the second tunnel communicating signaling traffic.

* * * * *

UNITED STATES PATENT AND TRADEMARK OFFICE
CERTIFICATE OF CORRECTION

PATENT NO.         : 10,911,413 B2
APPLICATION NO.    : 14/855542
DATED              : February 2, 2021
INVENTOR(S)        : Herrero Page 1 of 1

It is certified that error appears in the above-identified patent and that said Letters Patent is hereby corrected as shown below:

In the Claims

In Column 16, Line 26, in Claim 1, delete "data" and insert -- data, --, therefor.

Signed and Sealed this
Twenty-second Day of June, 2021

Drew Hirshfeld
*Performing the Functions and Duties of the*
*Under Secretary of Commerce for Intellectual Property and*
*Director of the United States Patent and Trademark Office*